(12) United States Patent
Julian (10) Patent No.: US 6,426,030 B1
(45) Date of Patent: Jul. 30, 2002

(54) METHOD OF MAKING A MOLDED INTERNALLY THREADED CLOSURE

(75) Inventor: Randall Julian, Newburgh, IN (US)

(73) Assignee: Rexam Medical Packaging Inc., Evansville, IN (US)

( * ) Notice: Subject to any disclaimer, the term of this patent is extended or adjusted under 35 U.S.C. 154(b) by 0 days.

(21) Appl. No.: 09/440,361

(22) Filed: Nov. 15, 1999

(51) Int. Cl.[7] .................................................. B28B 7/20
(52) U.S. Cl. ........................ 264/318; 264/334; 249/59; 425/556; 425/DIG. 58
(58) Field of Search ............................. 264/318, 328.1, 264/334, 336, 320; 425/DIG. 58, 556, 577, 438, 441; 249/59, 63

(56) References Cited

U.S. PATENT DOCUMENTS

| | | |
|---|---|---|
| 3,651,185 A | 3/1972 | Menkel |
| 4,497,765 A | * 2/1985 | Wilde et al. |
| 4,666,323 A | 5/1987 | Kessler |
| 4,767,587 A | 8/1988 | Towns et al. |
| 4,806,301 A | 2/1989 | Conti |
| 4,933,133 A | 6/1990 | Brown et al. |
| 5,053,182 A | 10/1991 | Hedgewick |
| 5,230,856 A | 7/1993 | Schellenbach |
| 5,281,385 A | 1/1994 | Julian |
| 5,421,717 A | 6/1995 | Hynds |
| 5,824,256 A | * 10/1998 | Ballester ...................... 264/334 |
| 5,932,164 A | * 8/1999 | Allen ......................... 264/334 |

* cited by examiner

*Primary Examiner*—Jill L. Heitbrink
(74) *Attorney, Agent, or Firm*—Charles G. Lamb; Middleton Reutlinger (57) ABSTRACT

A method of making a closure for a container is accomplished by providing a unitary mold with a mold cavity therein having vertically extending ribs and a rotatable and linearly movable threaded core element is received within the cavity. A formable plastic material is placed within the cavity and the core element is received within the cavity. Alternatively, the formable plastic material may be injected into the mold cavity. Upon contacting the formable plastic material with the core element the plastic material is forced around the outer surface of the core element and the inner surface of the cavity forming a closure with an internal thread and externally extending vertical ribs. The closure and the core element are backed out of the cavity wherein the core element is moved linearly and rotatably, but rotation of the closure is prevented. Once the core element is engaged with the internal threads of the closure only at the terminating end of the external threads of the core element, the article is completely removed from the cavity mold. Upon removal from the cavity mold, the weight of the closure in combination with gravity enables the closure to fall away from the core element. Alternatively, a concentric stripping ring or an ejector pin is used to cause the closure to fall away from the core element.

16 Claims, 7 Drawing Sheets

METHOD OF MAKING A MOLDED INTERNALLY THREADED CLOSURE

BACKGROUND OF THE INVENTION

This invention relates to a molded closure for a container and more particularly to a method for molding closures having internal threads and removing of the threaded closures from a mold.

Closures made by molding with inner threaded features are well known in the art. Generally, the apparatus used for making these articles includes a mold arrangement having a mold cavity and a movable core. The moveable core is received within the cavity wherein a moldable plastic material therein is formed into a plastic article which is defined by the spacing between the walls of the cavity and the outer surface of the core. Upon completion of molding of the article, particularly a threaded cap or closure, the article is normally withdrawn from the cavity by the core. Thus, a mechanism is required which cooperates with the core for subsequently removing the threaded molded article therefrom. A number of different methods for removing the threaded article from the core are described in U.S. Pat. No. 5,421,717 to Hynds which teaches an apparatus for forming threaded molded articles.

SUMMARY OF THE INVENTION

It has been found that a mold cavity with at least one longitudinally extending rib on the inner molding surface of the cavity in cooperation with an axially and rotatably moving mold core element received within the cavity provides the means for ejecting a molded threaded article from the mold.

More particularly, the present invention provides a method for molding a variety of plastic parts. Specifically, the present invention provides a method of making a closure for a container comprising: inserting a preselected amount of a formable plastic material into a mold cavity having a selected first diameter, the mold cavity having at least one longitudinally extending rib along the walls thereof; moving a linearly and rotatably moveable threaded core into the cavity wherein the core is of a second diameter which is less than the first diameter thereby defining a spacing therebetween; contacting the plastic material and forcing the plastic material into the spacing defined between the walls of the cavity and the core thereby forming a closure having internal threads; and removing the core from the cavity by backing the core out and by simultaneously rotating the core either at selected intervals or continuously. Insertion of the preselected amount of formable plastic material can be done by placing said material into the opening in the mold before the core is inserted, thereby using the force of core insertion to mold. Alternatively, said insertion can occur after said core is inserted by use of a pin hole in said mold through which said material is injected under pressure. The longitudinally extending ribs prevent the rotation of the threaded article when the core is rotatably backed out of the cavity. When the core is linearly backed out without rotation, or backed out and rotated at any rate relative to the rise of the helix angle of the molded threads, the threaded portion of the core, being in cooperating relation with the threads of the closure, forces the closure to move out of the mold cavity. When the closure is completely free of the mold cavity, there is generally just a portion of an internal thread of the closure still engageable with the threaded core. Thus, the weight of a relatively heavy closure can cause the closure to fall away from the core. Alternatively, the molding core can have a concentric stripper ring or an ejector pin moveably connected, said ring or pin being in flush contact with the bottom of a newly-molded closure skirt at the completion of the molding step. The ring can act on the surface of the molded closure to strip the closure from the core. Likewise, the pin can act on the molded closure adjacent to the threaded opening on the side opposite the thread tail-out. Of particular benefit to those who work in the closure art is the fact that by use of both a mechanical stripping means such as a ring or a pin, and an axial separation coupled with relative rotation, the closure can be molded with buttress type threads which are optimized for plastic parts. Because a pin can be used to roll the cap off of the end of the core, buttress type threads are used for even the very last portion of thread which remains in contact with the core before the closure is separated from the core. The last portion of thread can be rounded in order to ease the distortion caused to said closure by the stripping process in designs incorporating concentric stripping.

BRIEF DESCRIPTION OF THE DRAWINGS

A better understanding of the invention will be had upon reference to the following description in conjunction with the accompanying drawings in which like numerals refer to like parts throughout the several views and wherein.

DESCRIPTION OF THE PREFERRED EMBODIMENT

Figure 1:
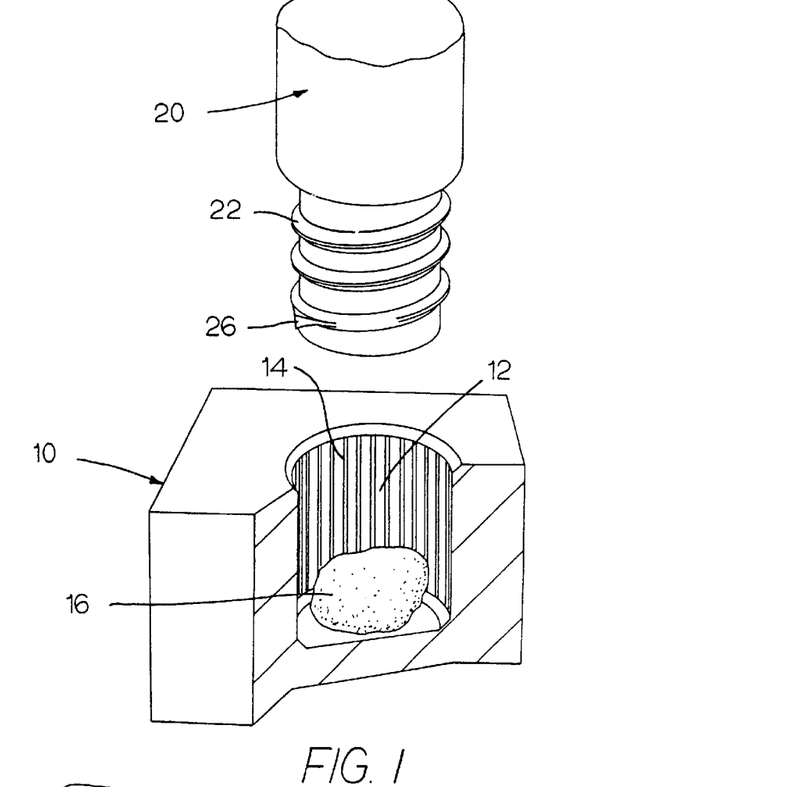
FIG. 1 is a perspective view with selected portions cut-away of a mold and mold core element of the present invention prior to insertion of the mold core element into a mold cavity.

In the FIGS. is illustrated a sequence of operations carrying out the process of making a molded internally threaded closure in accordance with the present invention. FIG. 1 shows a linearly moveable and rotatable mold core element with external thread 22 circumscribing the portion of the core to be received within mold cavity 12. The threads 22 terminate at a terminating end 26 which holds the article as it is removed from the mold cavity 12. Mold cavity 12, which is disposed within a unitary mold 10, is provided with a plurality of vertically extending ribs 14 which define the outer surface of the closure article to be molded from a moldable plastic 16.

Figure 1A:
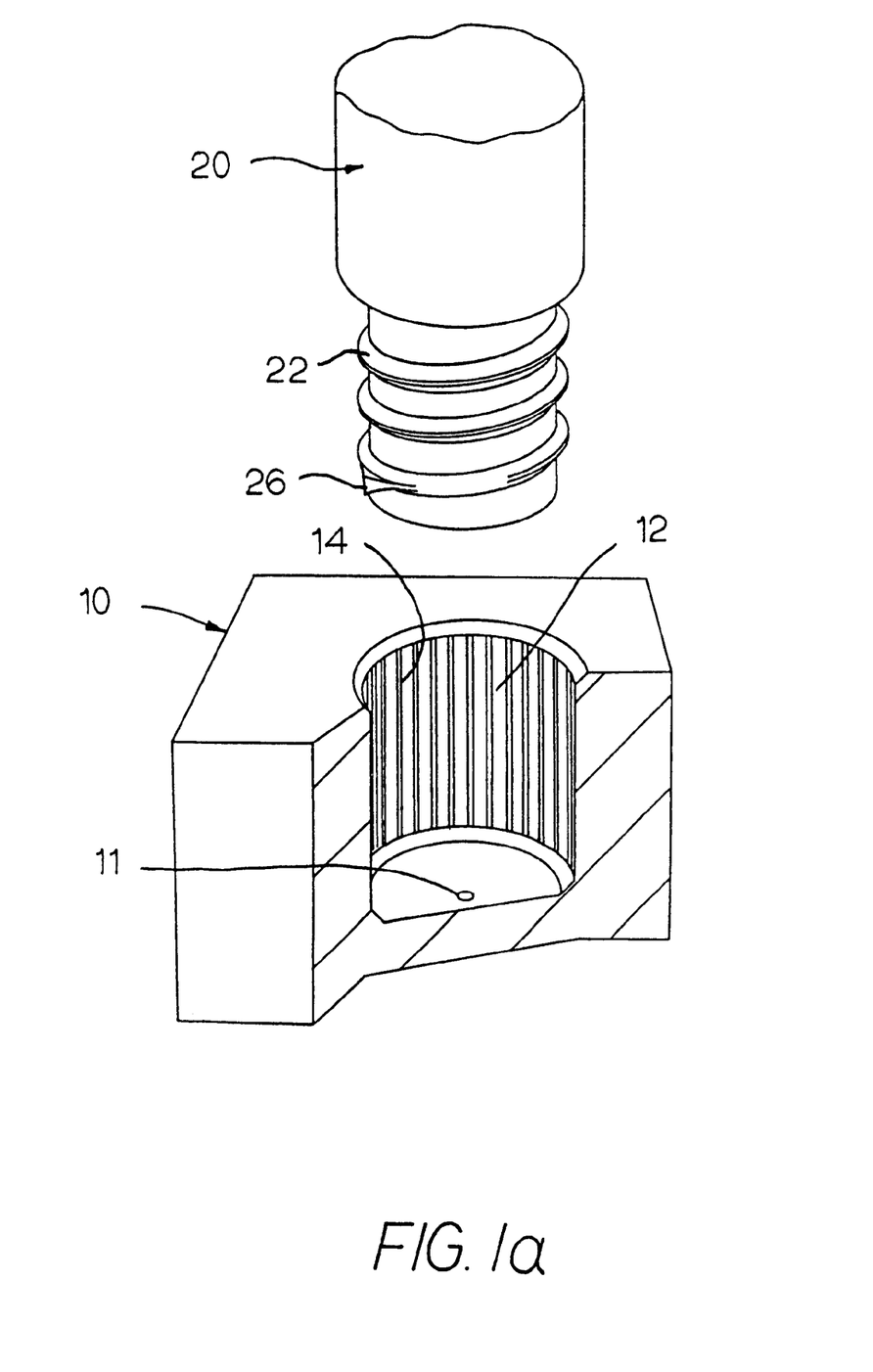
FIG. 1a is a perspective view with selected portions cut-away of a mold and mold core element of the present invention prior to insertion of the mold core element into a mold cavity wherein said mold cavity has present a pin hole for receiving injected plastic material.

FIG. 1a shows the same structure as FIG. 1, with the addition of a pin hole 11 which is used in conjunction with an alternative method wherein a plastic material is injected into the mold cavity 12.

Figure 1B:
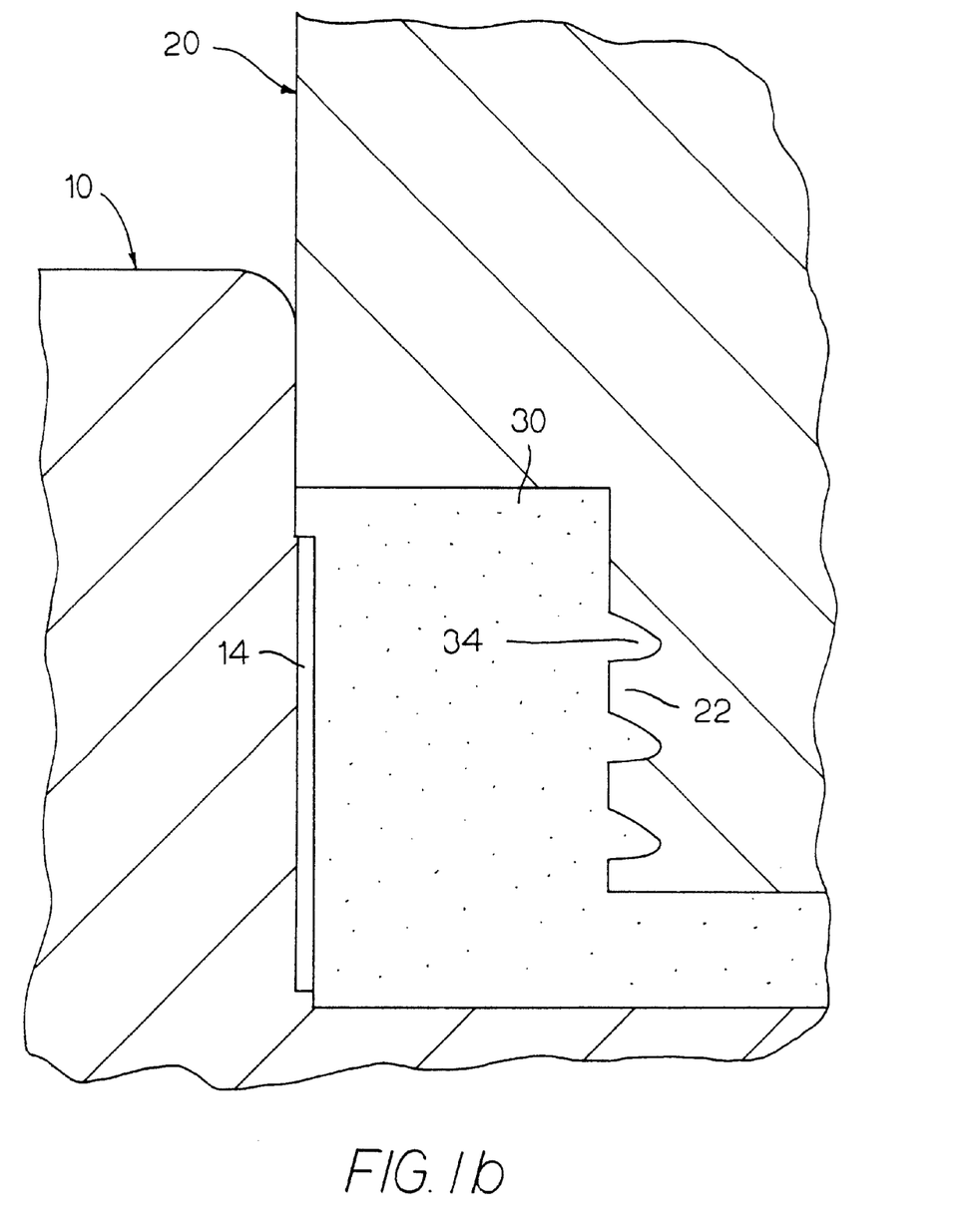
FIG. 1b is a partial section side view of a mold element and mold core element of the present invention after a closure has been formed therein.
Figure 2:
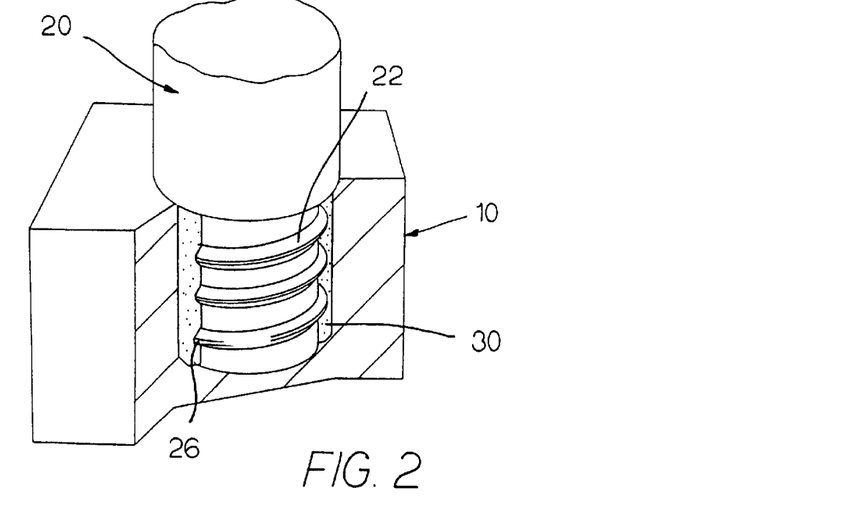
FIG. 2 is a perspective view with selected portions cut-away of a mold element and mold core element of the present invention with the mold core element being completely received within the mold cavity.

As shown in FIGS. 1b and 2, the core element 20 is completely inserted into the mold cavity 12 and has contacted the molded plastic material 16 (FIG. 1) to form the closure article 30 having a wall which is defined by the spacing between the outer surface of the mold core element 20 and the inner surface of the mold cavity 12.

Figure 3:
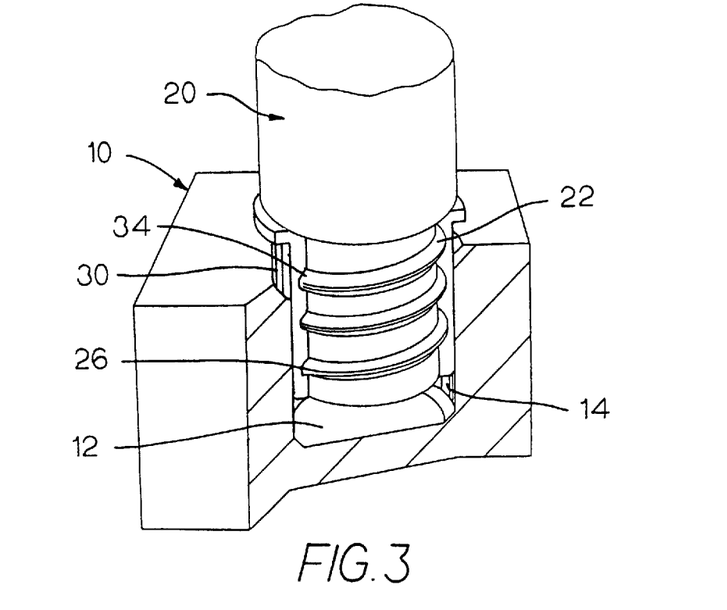
FIG. 3 is a perspective view with selected portions cut-away showing the core element and a molded article being removed from the mold cavity.

As shown in FIG. 3, the movable core element 20 in a non-rotatable condition has been linearly withdrawn out of the cavity 12 a preselected distance and in cooperating relation between the external threaded portion 22 of the movable core element 20 with the mateable threaded portion 34 of the article 30 moves the article 30, in turn, out of the cavity 12.

Figure 4:
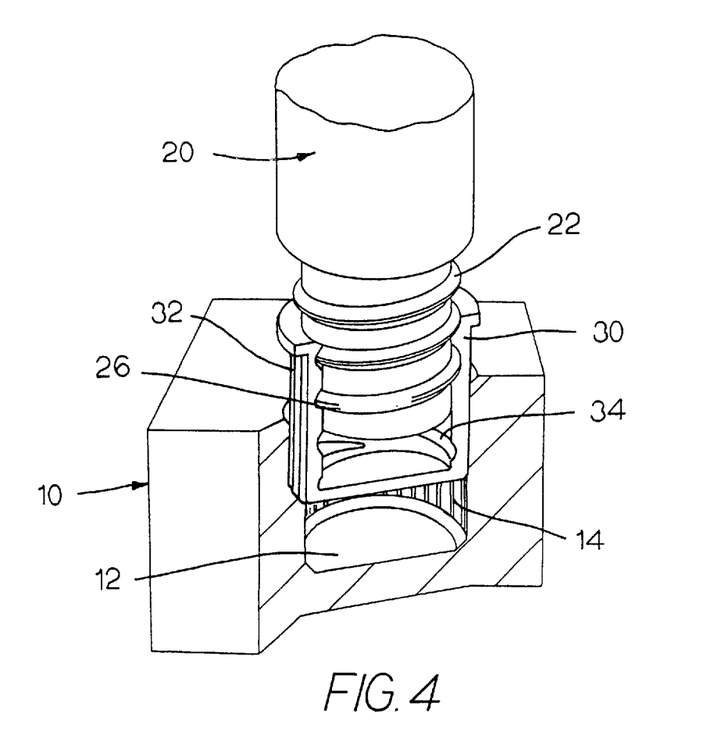
FIG. 4 is a perspective view with selected portions cut away showing the mold core element being rotated and backing out of the molded article.

As shown in FIG. 4, the movable core element 20 has been further axially withdrawn and rotated a preselected amount and the external ribs 32 in cooperating relation with the ribs 14 of the cavity 12 prevent the article from turning out of the mold cavity during the rotatable movement of the core element 20.

Figure 5:
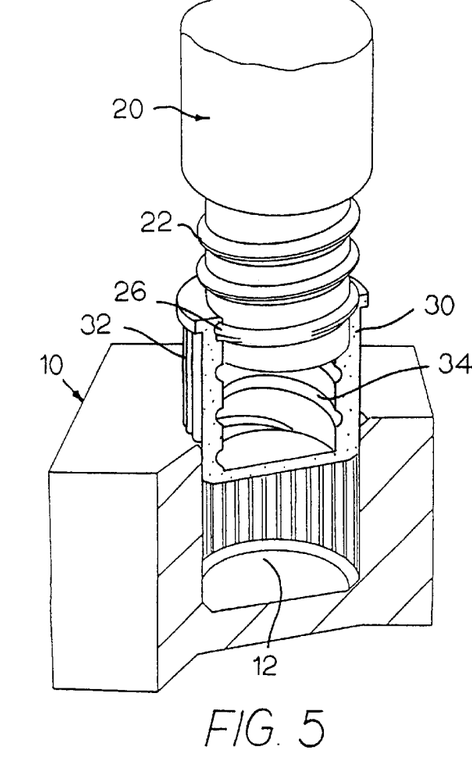
FIG. 5 is a perspective view with selected portions cut-away showing the molded core element and the molded article in the final stages of removal from the mold cavity.

As shown in FIG. 5, the movable core element 20 has been axially withdrawn and rotated a sufficient amount so that only a preselected portion of the terminating end 26 of the external threads 22 is engageable with the external threads 34 of the article 30. Once the article 30 is attached only to a selected degree of the terminating end 26 of the threads 22, the rotation is stopped and the core element 20 axially withdrawn from the cavity 16 until the article 30 is completely free of the cavity.

Figure 6:
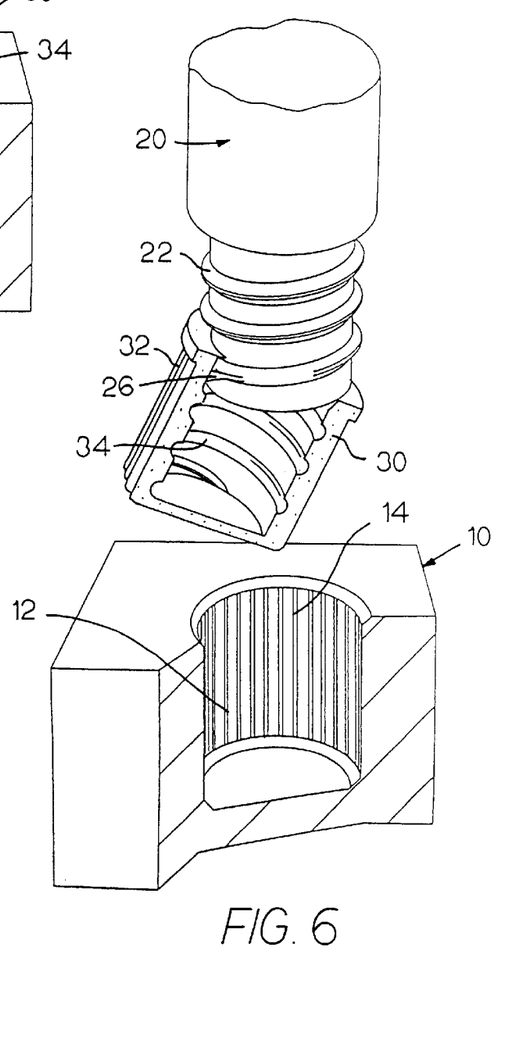
FIG. 6 is a perspective view with selected portions cut-away showing the molded article being completely removed from the mold cavity and falling away from the mold core element.

As shown in FIG. 6, the core element 20 and the article 30 have been completely removed from the cavity 12 and since only a portion of the terminating end 26 of the thread 22 is holding the article 30 thereon, the article 30 will fall away from the core element 20 due to the force of gravity if the article 30 is heavy enough.

In the backing out of the core 20 from the mold cavity 12, the core element 20 may be backed out in steps with rotation thereof or the rotation and backing out may be simultaneous. The sequence of backing out while in a rotatable or non-rotatable condition of the core elements is germane to the invention, as is the positioning of the closure article 30 on the core element as the article is removed from the mold cavity 12. Engagement between the article 30 and the core element 20 at only the terminating end 26 is essential so that with gravity, assuming that the article is heavy enough, once the article 30 is removed from the mold cavity 12, the weight of the article 30 enables the closure article 30 to fall away from the core element 20. Generally, the terminating end 26 makes up the last 15 degrees from the end of the thread profile. However, it is realized that the engagement between the threads 22 and 34 may extend as much as 90 degrees from the end of the thread profile as long as the engagement does not interfere with the article 30 falling away once the article 30 has become completely removed from the mold cavity 12.

Figure 7A:
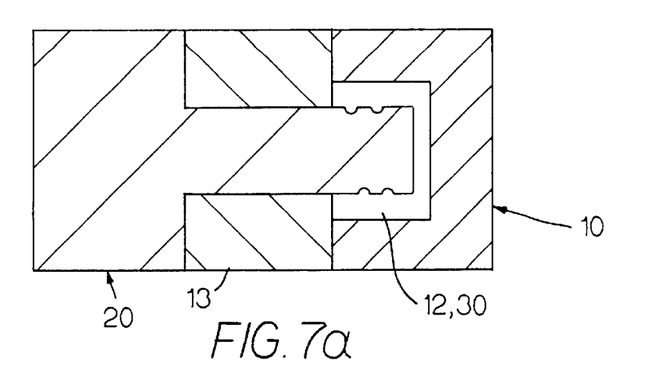
FIGS. 7a–7c show perspective views of an alternative embodiment of the invention wherein the article is being stripped from the core after rotation has stopped and only a portion of thread remains engaged; and, FIGS. 8a–8c show perspective views of another alternative embodiment of the invention wherein the article is being molded and then stripped from the core by means of an ejector pin after rotation has stopped and part removed from cavity with only a portion of thread remaining engaged.

In an alternative embodiment to the present invention, as shown in FIG. 7a, the moveable core element 20 has been inserted into the mold cavity 12. Sandwiched between the moveable core element 20 and the mold 10 is a concentric stripping ring 13 which contacts the closure article 30.

Figure 7B:
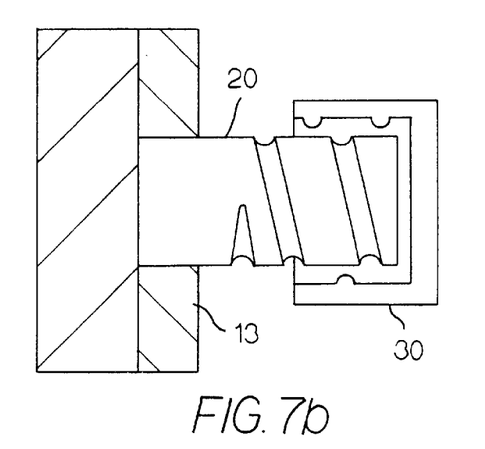

As shown in FIG. 7b, the moveable core element 20 has been partially rotated and withdrawn from the closure article 30 while at the same time being withdrawn from the mold cavity 12.

Figure 7C:
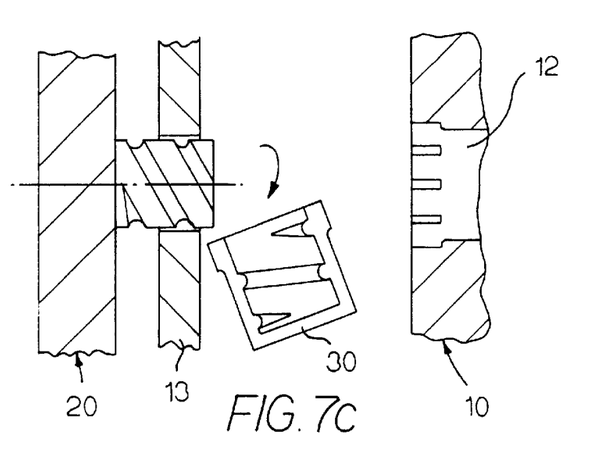

As shown in FIG. 7c, the concentric stripping ring 13 is in the act of performing its function of stripping the closure article 30 from the core 20. Note that the closure article 30 is completely withdrawn from the mold 10, and mold cavity 12 before the concentric stripping ring 13 is actuated.

Figure 8A:
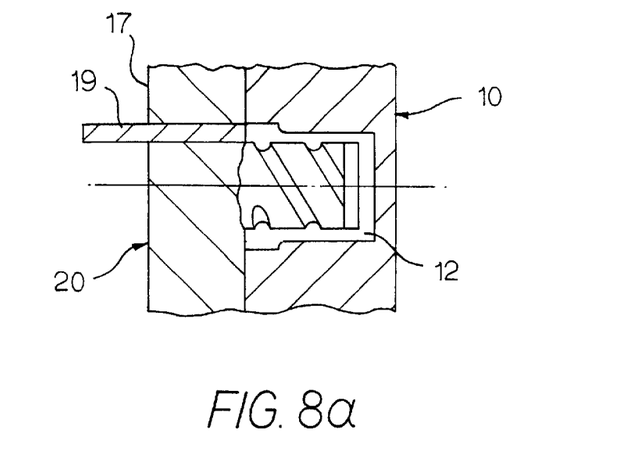

In even another embodiment of the present invention, as shown in FIG. 8a, the moveable core element 20 has been inserted into the mold cavity 12. Inserted into an orifice formed in the base 17 of the core 20 is an ejector pin 19.

Figure 8B:
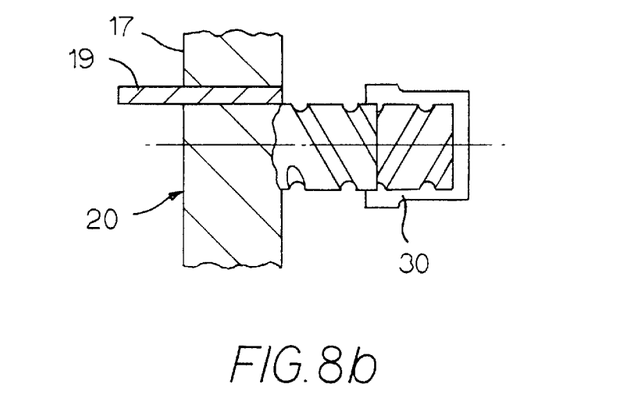

As shown in FIG. 8b, the moveable core element 20 has been partially rotated and withdrawn from the closure article 30, while at the same time being withdrawn from the mold cavity 12.

Figure 8C:
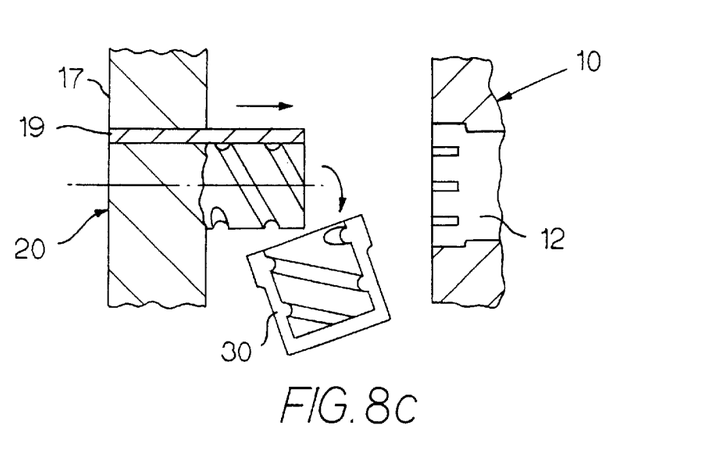

As shown in FIG. 8c, the ejector pin 19 has performed its function of ejecting the closure article 30 from the core 20.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A method of making a closure for a container comprising:

inserting a preselected amount of a formable plastic material into a mold cavity of a mold having a selected first diameter, said mold cavity having longitudinally extending ribs along an inner wall of said cavity;

moving a linearly and rotatably moveable threaded core element into said cavity, said core element having a second diameter less than said first diameter defining a spacing therebetween thereby forcing said plastic material into said spacing defined between said inner walls of said cavity and said core element thereby forming a closure having internal threads; and, non-rotatably backing said core element out of said cavity and rotating said core element at a preselected time during said backing out, said backing out including stopping rotation of said core element as said closure is separated from said cavity so that said closure is engaged with the terminating end of said threads on said core when said closure is completely backed out of said cavity.

2. The method of claim 1 wherein said backing said core element out of said cavity includes non-rotatable linear movement of said core element and stepwise rotation.

3. The method of claim 2 further comprising forcing of said closure past said terminating end of said threads on said core element.

4. The method of claim 3 wherein said forcing of said closure past said terminating end of said threads on said core element includes engaging linearly said closure with a concentric stripping ring.

5. The method of claim 3 wherein said forcing of said closure past said terminating end of said threads on said core element includes engaging linearly said closure with an ejector pin.

6. The method of claim 3 wherein said forcing of said closure past said terminating end of said threads on said core element is carried out by the force of gravity.

7. The method of claim 1 wherein said backing said core element out of said cavity includes linear movement of said core element and simultaneously rotating said core element.

8. The method of claim 7 further comprising forcing of said closure past said terminating end of said threads on said core element.

9. The method of claim 8 wherein said forcing of said closure past said terminating end of said threads on said core element includes engaging linearly said closure with a concentric stripping ring.

10. The method of claim 8 wherein said forcing of said closure past said terminating end of said threads on said core element includes engaging linearly said closure with an ejector pin.

11. The method of claim 8 wherein said forcing of said closure past said terminating end of said threads on said core element is carried out by the force of gravity.

12. The method of claim 1, said terminating end of said threads being less than 90° from said end of a thread profile.

13. The method of claim 10, said terminating end of said threads being about 15° from the end of said thread profile.

14. The method of claim 1, said mold being of unitary construction.

15. The method of claim 1 wherein said formable plastic material is placed into said mold cavity and said rotatably moveable threaded core element is inserted under force, thereby forming said formable plastic material to shape.

16. The method of claim 1 wherein said formable plastic material is injected into said mold cavity after said rotatably moveable threaded core element is moved into place.

* * * * *